US010988019B2

(12) United States Patent
Kamo et al.

(10) Patent No.: US 10,988,019 B2
(45) Date of Patent: Apr. 27, 2021

(54) EXHAUST STRUCTURE OF VEHICLE (71) Applicant: Mazda Motor Corporation, Hiroshima (JP)

(72) Inventors: Toshiaki Kamo, Hiroshima (JP); Hirokazu Hasegawa, Higashihiroshima (JP); Takahiro Ito, Hiroshima (JP); Shohei Morimoto, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 34 days.

(21) Appl. No.: 16/503,040

(22) Filed: Jul. 3, 2019

(65) Prior Publication Data
US 2020/0031219 A1    Jan. 30, 2020

(30) Foreign Application Priority Data

Jul. 27, 2018    (JP) .............................. JP2018-140837

(51) Int. Cl.
| *B60K 13/04* | (2006.01) |
| *B60K 6/26* | (2007.10) |
| *F01N 13/14* | (2010.01) |
| *F01N 1/02* | (2006.01) |
| *B60K 6/28* | (2007.10) |
| *F01N 1/00* | (2006.01) |

(52) U.S. Cl.
CPC ................ *B60K 13/04* (2013.01); *B60K 6/26* (2013.01); *B60K 6/28* (2013.01); *F01N 1/003* (2013.01); *F01N 1/02* (2013.01); *F01N 13/14* (2013.01); *B60Y 2200/92* (2013.01); *F01N 2590/11* (2013.01)

(58) Field of Classification Search
CPC .. B60K 13/04; B60K 6/26; B60K 6/28; F01N 1/003; F01N 1/02; F01N 1/14; F01N 2590/11; B60Y 2200/92
See application file for complete search history.

(56) References Cited

U.S. PATENT DOCUMENTS

2015/0129345 A1* 5/2015 Suzuki ................... B60K 6/405
180/292

FOREIGN PATENT DOCUMENTS

JP    2018024376 A    2/2018

* cited by examiner

*Primary Examiner* — Bryan A Evans
(74) *Attorney, Agent, or Firm* — Alleman Hall Creasman & Tuttle LLP (57) ABSTRACT An exhaust structure of a vehicle is provided that can ensure an arrangement space for a mounted component below a floor panel and prevent thermal damage to the mounted component by reducing sizes of an engine and an exhaust silencer. An exhaust structure of a vehicle includes: an engine disposed in an engine bay formed in a front part of a vehicle; a silencer that reduces noise of exhaust gas from the engine and discharges the exhaust gas outside; an exhaust pipe that couples the engine and the silencer; and a battery unit disposed behind the engine and below a floor panel, the silencer being disposed between the engine and the battery unit.

11 Claims, 5 Drawing Sheets

EXHAUST STRUCTURE OF VEHICLE

BACKGROUND OF THE INVENTION

Field of the Invention

The present invention relates to an exhaust structure of a vehicle, and particularly to an exhaust structure of a vehicle including a mounted component behind an engine and below a floor panel.

Description of the Related Art

Among electric vehicles, hybrid vehicles including an engine for power generation have an advantage over pure electric vehicles in terms of an extended range or a compact battery unit at present.

A vehicle in Japanese Patent Laid-Open No. 2018-24376 includes: an engine disposed in a front part of a vehicle body; an exhaust pipe extending rearward from the engine; a box-like battery unit secured to a lower back surface of the floor panel; and a power receiver that can receive power from a facility-side power feeder, the exhaust pipe being disposed to extend below the floor panel and near a side of the battery unit, and a heat shield member being provided between the exhaust pipe and the battery unit.

Hybrid vehicles including an engine are generally classified into three types: a split type in which engine power can be split into power-generating power and driving power, and an engine driving force and a motor driving force can be combined; a series type in which an engine is used only for charging and a motor is used only for driving; and a parallel type in which motor power can be selectively used for power generation and driving, and an engine driving force and a motor driving force can be combined.

A range extender type as one of the series types is attracting attention. An electric vehicle of the range extender type is configured so that an engine is temporarily started only when remaining power of a battery is low and operated under a preset specific operating condition.

A silencer (silencing device) that constitutes an exhaust system of an engine has a safety standard for an upper limit value of exhaust proximity noise specified by law (Road Transport Vehicle Law).

Vehicles produce exhaust noise in a wide frequency band including low to high frequencies corresponding to engine rotation speeds during operation. To reduce the exhaust noise below the safety standard in an entire operating range, a silencer requires a plurality of expansion chambers, resonance chambers, and partition walls, and thus inevitably has a large size to satisfy the safety standard.

Thus, the silencer is generally disposed in a rear part of a vehicle body (for example, below a kick-up portion) where an arrangement space can be ensured, and coupled to an engine disposed in an engine bay in a front part of the vehicle body via a long exhaust pipe.

SUMMARY OF THE INVENTION

The vehicle in Japanese Patent Laid-Open No. 2018-24376 can avoid a thermal effect on an electric connection wiring member.

However, with the technique in Japanese Patent Laid-Open No. 2018-24376, a range of the vehicle may be reduced.

Specifically, Japanese Patent Laid-Open No. 2018-24376 does not specifically indicate arrangement of a silencer, but the exhaust pipe extends below the floor panel and near the side of the battery unit. Thus, the exhaust pipe occupies a space to reduce an arrangement space for the battery unit as a mounted component. This reduces battery capacity.

Moreover, in the vehicle in Japanese Patent Laid-Open No. 2018-24376, the exhaust pipe is provided to extend near the side of the battery unit as the mounted component, and thus, thermal degradation may reduce battery life.

For example, for a lithium ion battery, aging degradation of a negative carbon electrode changes a molecular structure of carbon to reduce lithium ions inserted into the carbon electrode during discharge.

The reduction in inserted ions is accelerated by heat (temperature increase), and if a heat source is close to the battery unit, the battery may be thermally degraded.

An object of the present invention is to provide an exhaust structure of a vehicle or the like that can ensure an arrangement space for a mounted component below a floor panel and prevent thermal damage to the mounted component.

An exhaust structure of a vehicle according to a first aspect of the present invention includes: an engine disposed in an engine bay formed in a front part of a vehicle; an exhaust silencer that reduces noise of exhaust gas from the engine and discharges the exhaust gas outside; an exhaust pipe that couples the engine and the exhaust silencer; and a mounted component disposed behind the engine and below a floor panel, the exhaust silencer being disposed between the engine and the mounted component.

In this exhaust structure of a vehicle, the exhaust silencer is disposed between the engine and the mounted component. Thus, the exhaust pipe that couples the engine and the exhaust silencer can be arranged forward of and apart from the mounted component, thereby expanding an arrangement space for the mounted component and preventing thermal damage to the mounted component.

In the exhaust structure of a second aspect of the present invention according to the first aspect, the engine is operated under a preset specific operating condition.

With this configuration, the engine is operated under the preset specific operating condition, thereby allowing a reduction in size of the engine. The engine is operated under the specific operating condition to limit frequencies of the generated exhaust gas correspondingly to engine rotation speeds during operation, thereby allowing a reduction in size of the exhaust silencer with decreasing frequency of noise to be eliminated.

Specifically, the engine and the exhaust silencer can be reduced in size and thus disposed in the engine bay formed in the front part of the vehicle.

In the exhaust structure of a third aspect of the present invention according to the first or second aspect, a drive motor that drives wheels and a generator driven by the engine are provided in the engine bay, the wheels are driven only by the drive motor, and the mounted component is a battery that can store power supplied from the generator and supply the stored power to the drive motor.

With this configuration, a thermal effect on the battery can be avoided to ensure battery capacity and extend battery life.

In the exhaust structure of a fourth aspect of the present invention according to any one of the first to third aspects, a heat shield wall is provided between the exhaust silencer and the mounted component.

With this configuration, a thermal effect on the mounted component can be reliably avoided.

In the exhaust structure of a fifth aspect of the present invention according to the fourth aspect, a width of the heat shield wall in a vehicle width direction is equal to or larger than a width of the mounted component in the vehicle width direction.

With this configuration, the thermal effect on the mounted component can be avoided in an entire region in the vehicle width direction.

In the exhaust structure of a sixth aspect of the present invention according to any one of the first to fifth aspects, the exhaust silencer is disposed in a middle position in the vehicle width direction and includes a tail pipe, the tail pipe extends to a vicinity of one end in the vehicle width direction, and an outlet of the tail pipe is provided at the vicinity of the one end in the vehicle width direction.

With this configuration, the exhaust gas discharged from the tail pipe is discharged outside from the one end in the vehicle width direction, thereby preventing the exhaust gas from coming into contact with the mounted component and further avoiding the thermal effect.

In the exhaust structure of a seventh aspect of the present invention according to the sixth aspect, a heat shield wall is provided between the exhaust silencer and the mounted component, and lower ends of the exhaust silencer and the tail pipe are disposed above a lower end of the heat shield wall.

With this configuration, traveling air flowing into a lower part of the vehicle is returned by the heat shield wall to cool the tail pipe, thereby cooling the exhaust gas flowing through the tail pipe and reliably avoiding the thermal effect on the mounted component.

The exhaust structure of a vehicle according to the aspects of the present invention can ensure the arrangement space for the mounted component below the floor panel and prevent thermal damage to the mounted component.

DETAILED DESCRIPTION OF THE PREFERRED EMBODIMENT

Now, an embodiment of the present invention will be described in detail with reference to the drawings.

The description below exemplifies application of the present invention to an exhaust structure of an electric vehicle V, and is not intended to limit the present invention, its application, or its use.

Embodiment 1

Now, with reference to FIGS. 1 to 6, Embodiment 1 of the present invention will be described.

Figure 1:
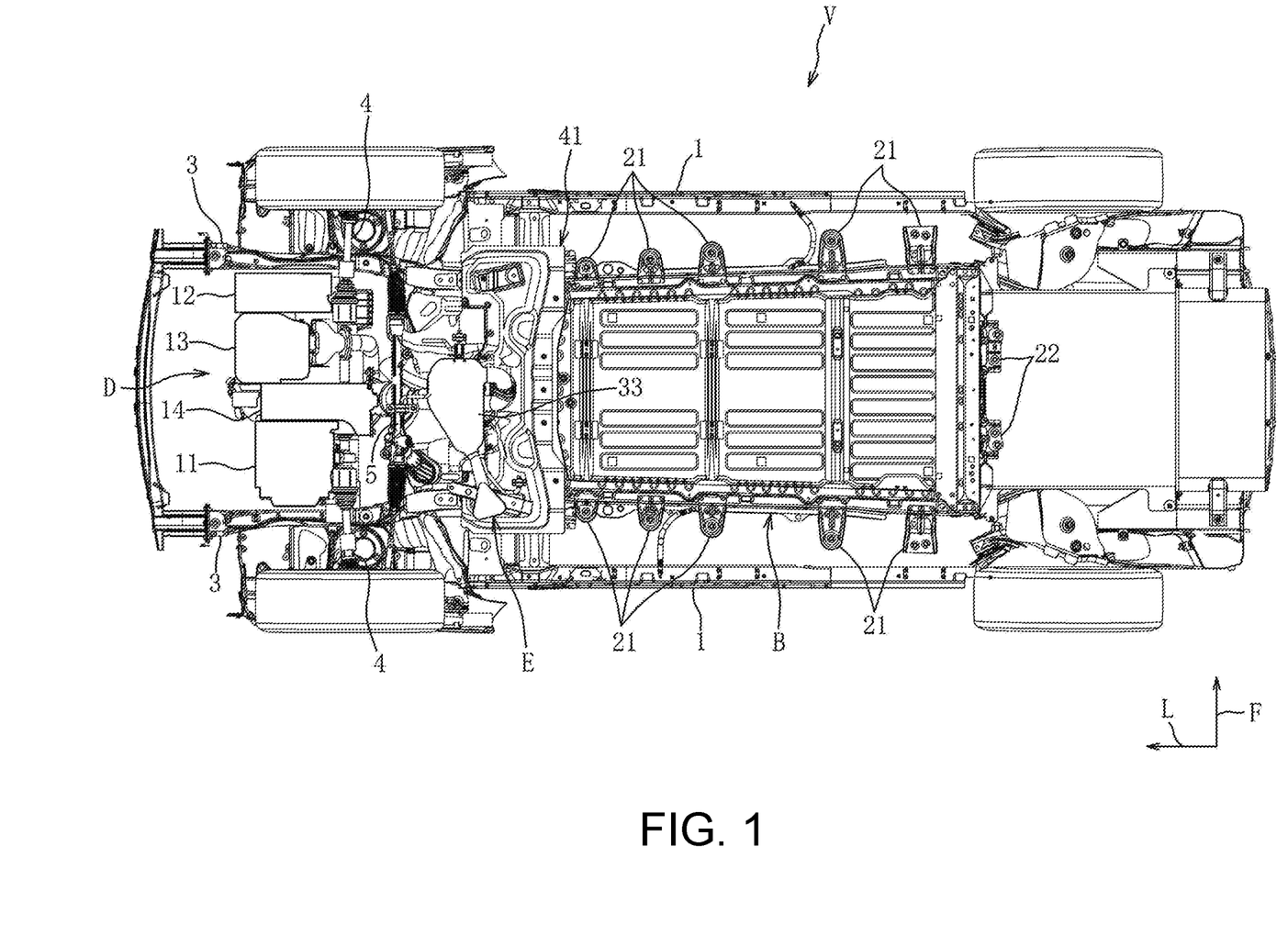
FIG. 1 is a schematic bottom view of a vehicle according to Embodiment 1.
Figure 2:
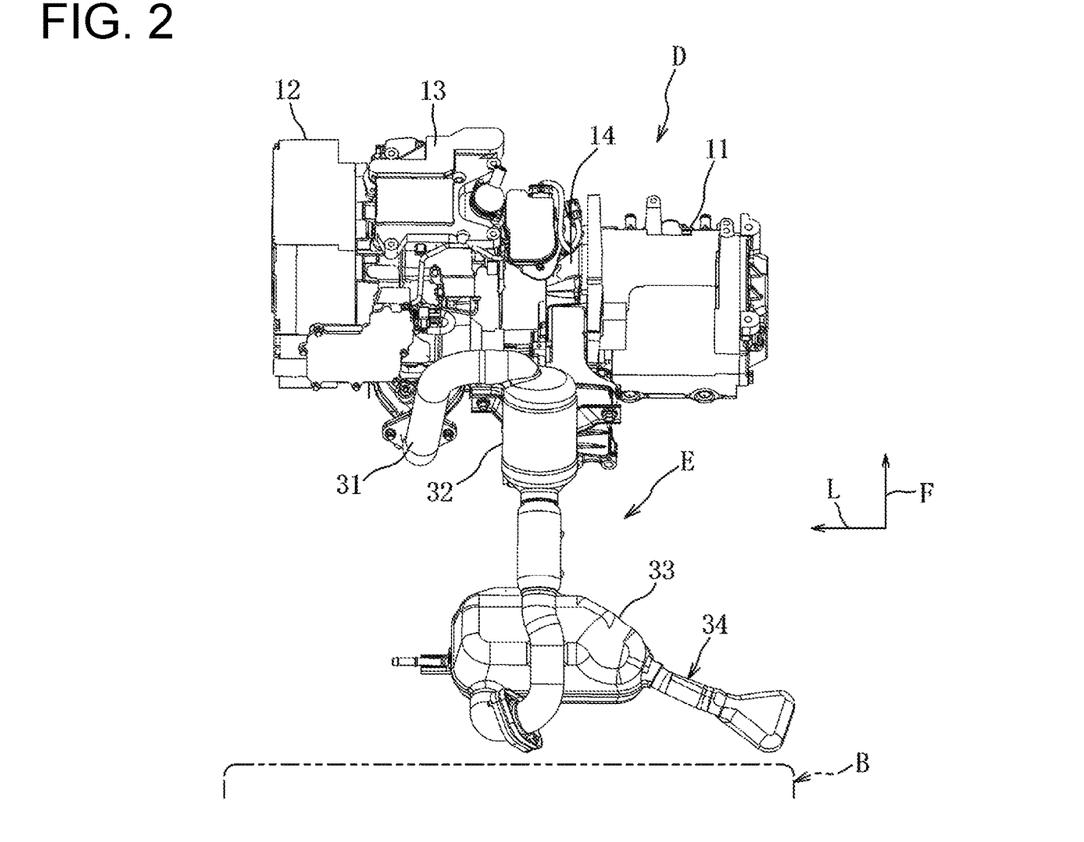
FIG. 2 shows a drive unit seen from an upper rear side.
Figure 3:
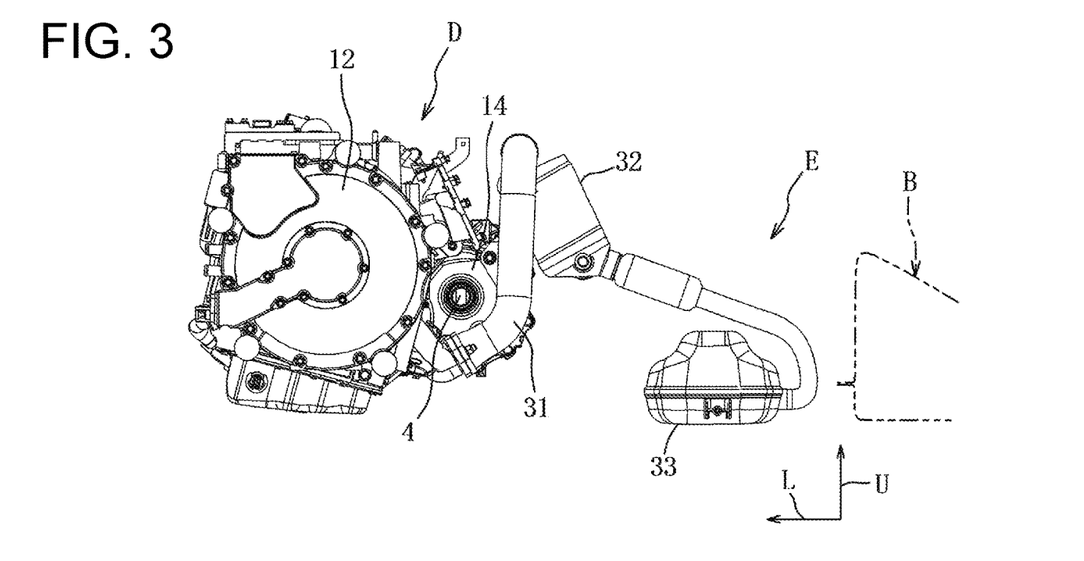
FIG. 3 is a side view of the drive unit.

As shown in FIG. 1, the electric vehicle V includes a drive unit D that rotationally drives drive wheels, a battery unit B, an exhaust system E, and the like.

The vehicle V is an electric vehicle of a range extender type configured so that an engine is temporarily started and operated under a preset specific operating condition to carry out power generation and charging only when remaining power of the battery unit B is low (for example, a state of charge (SOC) is less than 30%).

The vehicle V may include a charging plug that allows charging using a normal charger as a domestic power source or a quick charger installed in a parking area or the like.

First, a basic structure of a skeleton member of the vehicle V will be described.

As shown in FIG. 1, the vehicle V includes a pair of left and right side sills 1 that form a closed section extending in a front-rear direction, a floor panel 2 (see FIG. 4) extending between the pair of side sills 1, a pair of left and right floor frames (not shown) on inner sides of the pair of left and right side sills 1 in a vehicle width direction, the floor frames together with a lower surface of the floor panel 2 forming a closed section extending in the front-rear direction, a pair of left and right front side frames 3 that extend forward from a dash panel (not shown) rising from a front end of the floor panel 2 and have rear ends coupled to front ends of the pair of floor frames, and the like.

In the drawings, an arrow F indicates a front side, an arrow L indicates a left side, and an arrow U indicates an upper side.

Front ends of the pair of side sills 1 and rear ends of the pair of front side frames 3 are connected via a torque box. An engine bay is formed in a space between the pair of front side frames 3 and in front of the dash panel.

In the engine bay, a drive unit D, an exhaust system E, a drive shaft 4 that drives front wheels, a rack-and-pinion 5 coupled to a tie rod that steers the front wheels, and the like are disposed.

Figure 4:
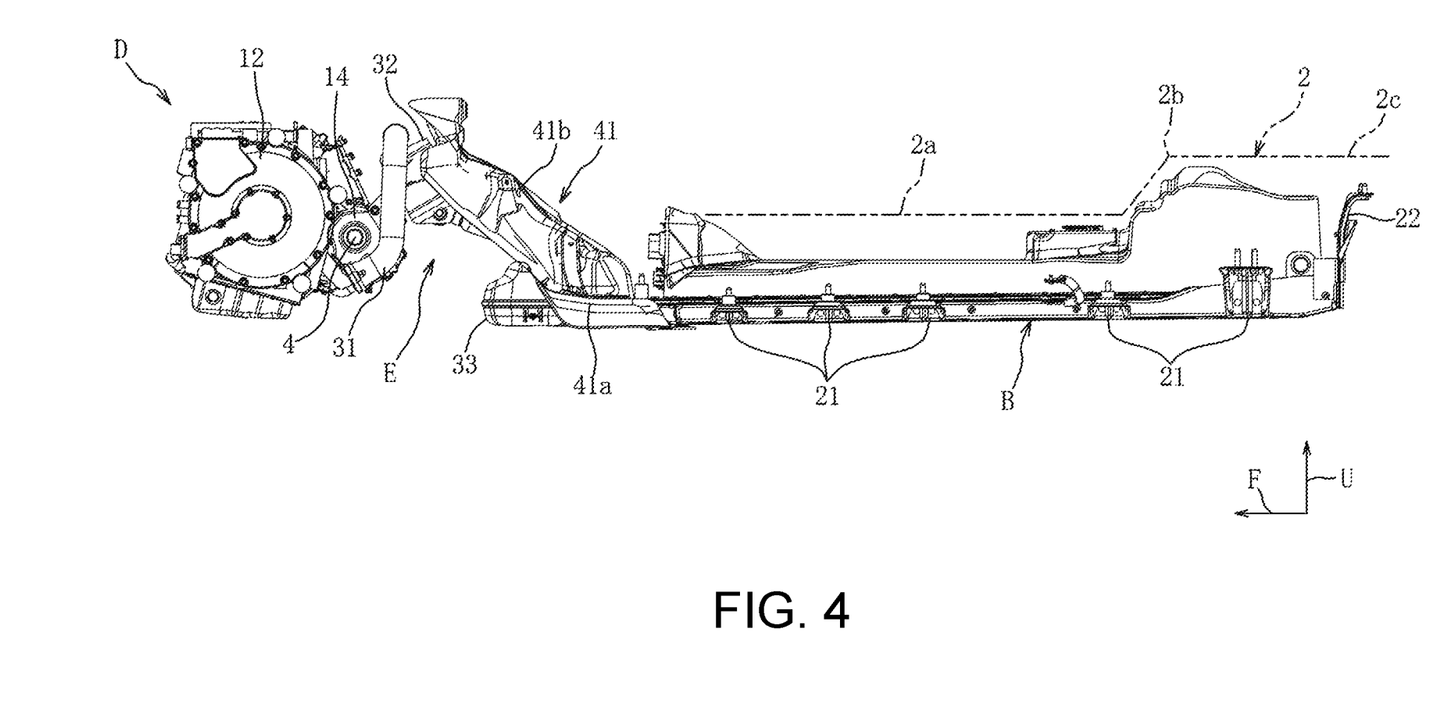
FIG. 4 is a side view of the drive unit and a battery unit.

As shown in FIG. 4, the floor panel 2 includes a substantially horizontal front floor panel 2a that forms a floor surface of a vehicle interior and on which a front seat (not shown) is disposed, a kick-up portion 2b inclined rearward and upward from a rear end of the front floor panel 2a and on which a rear seat (not shown) is disposed, and a rear floor panel 2c extending rearward from the kick-up portion 2b. Below the floor panel 2, the battery unit B is disposed to face lower surfaces of the front floor panel 2a and the kick-up portion 2b.

Next, the drive unit D will be described.

As shown in FIGS. 1 to 4, the drive unit D integrally includes a traveling drive motor 11, a generator 12, an engine 13 that drives the generator 12, a transmission 14, and the like.

The drive motor 11 is disposed so that a rotary shaft laterally extends in a right region of the engine bay, and power is supplied from the battery unit B via an inverter (not shown) to the drive motor 11.

The drive motor 11 also serves as a generator during deceleration of the vehicle V, and regenerative power generated is fed to the battery unit B.

The generator 12 is disposed so that a rotary shaft laterally extends in a left region of the engine bay, and driven by the engine 13 to generate power, which is fed via the inverter to the battery unit B. The generator 12 is arranged adjacent to a left side of the engine 13, and a rotary shaft of the generator 12 and an output shaft of the engine 13 are coupled via an endless body such as a belt.

The generator 12 has a starter function of receiving the power supplied from the battery to activate the engine 13 when starting the engine 13.

Fuel is supplied from a fuel tank (not shown) to the engine 13 to cause rated operation of the engine 13, thereby driving the generator 12 disposed on the left side of the engine 13.

In this embodiment, an operating condition (rotation speed and load) of the engine 13 is preset based on power generation efficiency of the generator 12 and fuel efficiency performance of the engine 13. The engine 13 is controlled under the operating condition (specific operating condition).

The rotation speed as the operating condition may be a single set rotation speed or two or more set rotation speeds including a set rotation speed focusing on fuel efficiency and a set rotation speed for quick charging. The load as the operating condition may be a single set load or two or more set loads including a set load focusing on fuel efficiency and a set load for quick charging.

The engine 13 is a compact rotary piston engine with one rotor, and disposed so that the output shaft (eccentric shaft) extends laterally.

Specifically, the engine 13 includes a substantially triangular rotor, a rotor housing that houses the rotor, and a pair of left and right side housings that hold the rotor housing therebetween and define the rotor housing.

An intake port opens in a front part of the rotor housing, and an exhaust port opens in a rear lower part of the side housing.

As shown in FIGS. 1 to 4, the transmission 14 is disposed to be held between the drive motor 11 and the engine 13 in a laterally middle region of the engine bay.

The transmission 14 includes a counter shaft with a plurality of transmission gears, decelerates power transmitted from the engine 13 to an input shaft to a desired reduction ratio and outputs the power to the output shaft, and finally decelerates and transmits an output of the output shaft to the drive shaft 4.

Next, the battery unit B will be described.

The battery unit B is formed of an upper cover and a lower cover made of synthetic resin into a substantially flat box shape, and houses a plurality of battery modules (not shown) connected in series.

A battery module is arranged in one stage below the front floor panel 2a, and battery modules are arranged in two upper and lower stages below the kick-up portion 2b.

The battery module is a rectangular parallelepiped battery assembly in which, for example, a plurality of rectangular parallelepiped battery cells (not shown) having a standard voltage are stacked in a vertical direction with a separator therebetween. The battery cell is, for example, a lithium ion battery as one type of secondary battery.

As shown in FIGS. 1 and 4, five side brackets 21 are provided on each of left and right ends of the battery unit B (lower cover), and two rear brackets 22 are provided on a rear end. Each side bracket 21 is fastened by a bolt to the floor frame, and each rear bracket 22 is fastened by a bolt to a cross member (not shown) that separates the vehicle interior from a baggage compartment and forms a laterally extending closed section together with the rear floor panel 2c.

Next, the exhaust system E will be described.

As shown in FIGS. 1 to 4 and 6, the exhaust system E includes an exhaust pipe 31 through which an exhaust gas flows, a catalyst 32 provided midway of the exhaust pipe 31, a silencer 33 provided at a downstream end of the exhaust pipe 31, a tail pipe 34 that discharges the exhaust gas outside from the silencer 33, and the like.

The exhaust pipe 31 is connected to the exhaust port opening in the rear lower part of the engine 13 (side housing) and rises vertically upward from below the drive shaft 4.

The exhaust pipe 31 rising upward is inclined rearward and downward from a top.

The downstream end of the exhaust pipe 31 is once curved forward near a front side of the battery unit B and communicates with a lead-in opening formed in a left side of a rear wall of the silencer 33.

The catalyst 32 has a substantially cylindrical shape and is disposed near a downstream side of the top of the exhaust pipe 31. The catalyst 32 is a three-way catalyst.

The silencer 33 is configured to absorb acoustic energy in a specific frequency band corresponding to the rated operating condition of the engine 13 and reduce exhaust noise.

The silencer 33 includes therein expansion chambers and resonance chambers of the numbers corresponding to a so-called frequency of noise to be eliminated for reducing acoustic energy in the specific frequency band, and thus has a much smaller size than a silencer including expansion chambers and resonance chambers for reducing acoustic energy in all frequency bands. A configuration of such a silencer is known and a detailed description thereof is omitted.

As shown in FIGS. 1 to 4 and 6, the silencer 33 has a substantially flat shape, and is disposed in a middle position of the engine bay in the vehicle width direction, specifically, on a rear side of the transmission 14 and a front side of the battery unit B below the exhaust pipe 31 inclined rearward.

In this embodiment, the silencer 33 is arranged so that its upper end is lower than the drive shaft 4 and its lower end is higher than a lower end of the battery unit B, thereby forming a space for avoiding interference at the time of collision in front of the silencer 33.

The tail pipe 34 communicates with a lead-out opening formed in a right side wall of the silencer 33, and is disposed to substantially linearly extend rearward toward the right side.

A downstream end of the tail pipe 34 has an opening through which the exhaust gas is discharged outside.

The opening is oriented downward so that its lower end 34u is higher than the lower end of the battery unit B.

Figure 6:
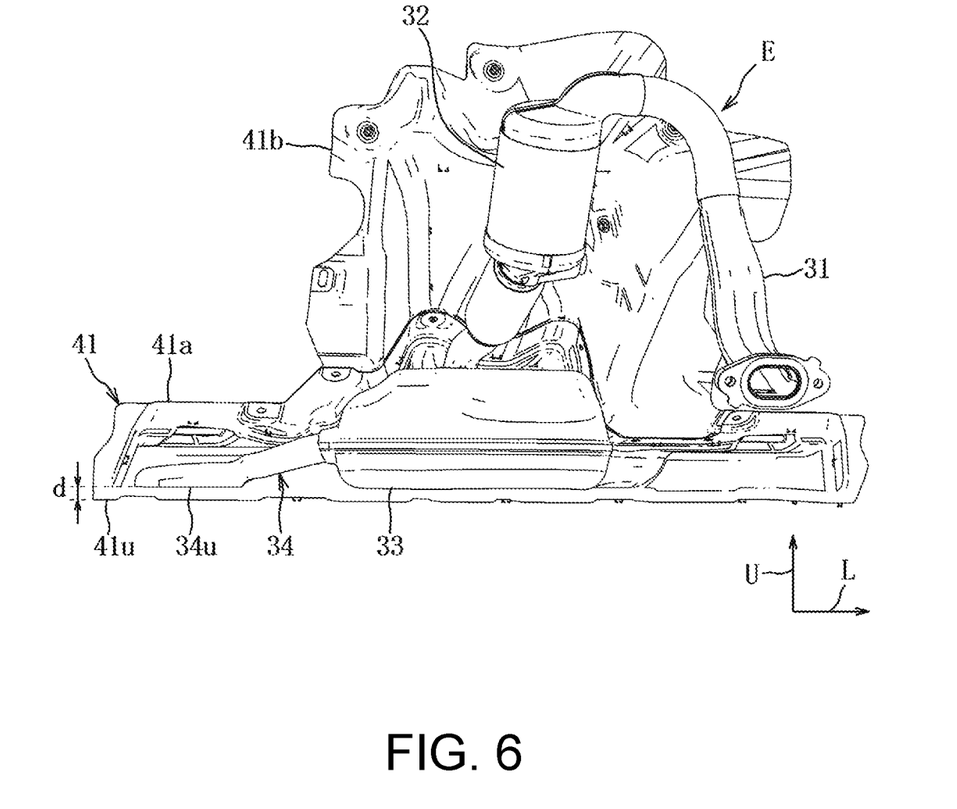
FIG. 6 is a front view of an exhaust system and the heat shield member.

As shown in FIGS. 1, 4 and 6, to prevent thermal damage to the battery unit B, a heat shield member 41 (heat shield wall) made of an aluminum alloy is provided between the battery unit B and the exhaust system E.

The heat shield member 41 is formed to cover a rearward inclined part of the exhaust pipe 31, the catalyst 32, and a rear half of the silencer 33. A lateral size of the heat shield member 41 is larger than a lateral size of the battery unit B.

As shown in FIGS. 1, 4, 5, and 6, the heat shield member 41 includes a partially tub-shaped lower half 41a extending laterally, and an upper half 41b having a substantially U-shaped section and extending upward from a middle part of the lower half 41a.

The lower half 41a has a lateral width larger than a width of the battery unit B in the vehicle width direction. Lower ends of left and right end parts extend outward in the vehicle width direction, and a lower end of a rear end part extends rearward. The lower end of the rear end part of the lower half 41a is secured to a front lower surface of the battery unit B, and thus a lower end 41u of the lower half 41a is lower than the lower end 34u that is a lower end of the opening of the tail pipe 34 by a predetermined distance d (see FIG. 6).

The opening of the tail pipe 34 is arranged adjacent to a front side of the right end of the lower half 41a.

Figure 5:
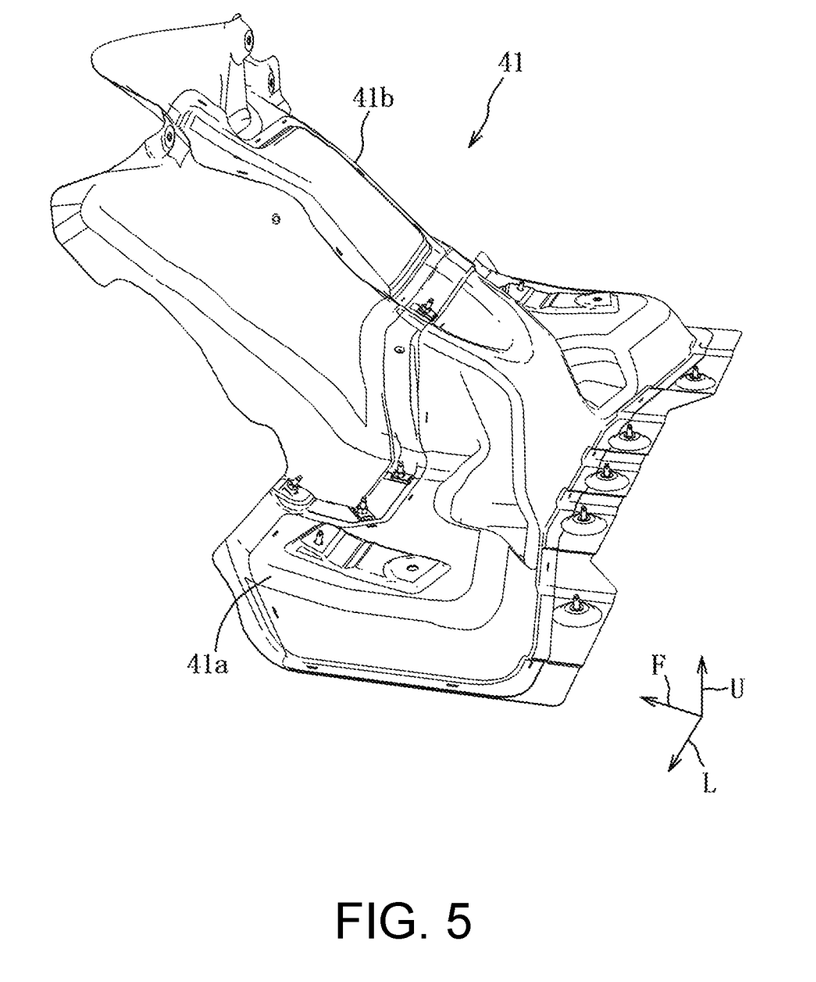
FIG. 5 is a perspective view of a heat shield member.

As shown in FIGS. 4 to 6, the upper half 41b is configured so that lower ends of left and right end parts extend outward in the vehicle width direction, and is inclined forward and upward along the rearward inclined part of the exhaust pipe 31 from a rear of a laterally middle part of the lower half 41a to an upper end of the catalyst 32.

Thus, heat radiated from the catalyst 32 and the exhaust pipe 31 is guided to the upper half 41b and diffused from an upper part of the upper half 41b to above the engine bay.

Heat shield portions extending in the front-rear direction from left and right ends of the heat shield member 41 along left and right vertical walls of the battery unit B may be provided to achieve heat resistance and water resistance of the battery unit B and improve appearance.

Next, operations and effects of the exhaust structure of the vehicle will be described.

With the exhaust structure of the vehicle V according to Embodiment 1, the silencer 33 is disposed between the engine 13 and the battery unit B, and thus the exhaust pipe 31 that couples the engine 13 and the silencer 33 can be arranged forward of and apart from the battery unit B, thereby expanding an arrangement space for the battery unit B and preventing thermal damage to the battery unit B.

The engine 13 is operated under the preset specific operating condition.

Thus, the engine 13 is operated under the preset specific operating condition, thereby allowing a reduction in size of the engine 13. In addition, the engine 13 is operated under the specific operating condition to limit frequencies of the generated exhaust gas correspondingly to rotation speeds of the engine 13 during operation, thereby allowing a reduction in size of the silencer 33 with decreasing frequency of noise to be eliminated.

Specifically, the engine 13 and the silencer 33 can be reduced in size, and thus, arranged in the engine bay formed in the front part of the vehicle.

The drive motor 11 that drives the wheels and the generator 12 driven by the engine 13 are provided in the engine bay, the wheels are driven only by the drive motor 11, and the mounted component is the battery unit B that can store power supplied from the generator 12 and supply the stored power to the drive motor 11. Thus, a thermal effect on the battery unit B can be avoided to ensure battery capacity and extend battery life.

The heat shield member 41 is provided between the silencer 33 and the battery unit B. Thus, a thermal effect on the battery unit B can be reliably avoided.

The width of the heat shield member 41 in the vehicle width direction is equal to or larger than the width of the battery unit B in the vehicle width direction. Thus, the thermal effect on the battery unit B can be avoided in an entire region in the vehicle width direction.

The silencer 33 is arranged in the middle position in the vehicle width direction and includes the tail pipe 34, the tail pipe 34 extends to near one end in the vehicle width direction, and the outlet of the tail pipe 34 is provided near the one end in the vehicle width direction.

Thus, the exhaust gas from the tail pipe 34 is discharged outside from the one end in the vehicle width direction, thereby preventing the exhaust gas from coming into contact with the battery unit B and further avoiding the thermal effect.

The lower ends of the silencer 33 and the tail pipe 34 are disposed above the lower end of the heat shield member 41. Thus, traveling air flowing into the lower part of the vehicle is returned by the heat shield member 41 to cool the tail pipe 34, thereby cooling the exhaust gas flowing through the tail pipe 34 and reliably avoiding the thermal effect on the battery unit B.

Next, a variant of the embodiment with a partial modification will be described.

1) In the embodiment, the example of the rotary engine with one rotor has been described. However, any engines including one or more reciprocating engines may be used as long as they can drive a generator at rated power.

2) In the embodiment, the example in which the mounted component is the battery unit housing the plurality of battery modules has been described. However, a similar advantage can be obtained with at least a large component that requires avoidance of thermal damage and is mounted below the floor panel.

Although the example in which the battery unit houses the lithium ion battery has been described, the battery unit may house a different type of battery or may be a driving source housing unit.

3) In the embodiment, the example in which the silencer includes the expansion chambers and the resonance chambers for reducing acoustic energy in the specific frequency band has been described. However, the silencer may include at least either the expansion chambers or the resonance chambers, or the silencer may include a large silencing chamber that covers a plurality of holes provided in the exhaust pipe.

4) In addition, those skilled in the art could implement the embodiment with various modifications or a combination of embodiments without departing from the gist of the present invention, and the present invention encompasses such modifications. It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS 2 floor panel
11 drive motor
12 generator
13 engine
31 exhaust pipe
33 silencer
34 tail pipe
B battery unit
D drive unit
E exhaust system
V vehicle

What is claimed is:

1. An exhaust structure of a vehicle comprising:
an engine disposed in an engine bay formed in a front part of the vehicle;
an exhaust silencer that reduces noise of exhaust gas from the engine and discharges the exhaust gas outside;
an exhaust pipe that couples the engine and the exhaust silencer; and
a mounted component disposed behind the engine and below a floor panel, wherein the exhaust silencer is disposed between the engine and the mounted component,
a drive motor that drives wheels and a generator driven by the engine are provided in the engine bay,
the wheels are driven only by the drive motor, and
the mounted component is a battery that can store power supplied from the generator and supply the stored power to the drive motor.

2. The exhaust structure of the vehicle according to claim 1, wherein the engine is operated under a preset specific operating condition.

3. The exhaust structure of the vehicle according to claim 1, wherein a heat shield wall is provided between the exhaust silencer and the mounted component.

4. The exhaust structure of the vehicle according to claim 3, wherein a width of the heat shield wall in a vehicle width direction is equal to or larger than a width of the mounted component in the vehicle width direction.

5. The exhaust structure of the vehicle according to claim 1, wherein
the exhaust silencer is disposed in a middle position in a vehicle width direction and includes a tail pipe, and
the tail pipe extends to a vicinity of one end in the vehicle width direction, and an outlet of the tail pipe is provided at the vicinity of the one end in the vehicle width direction.

6. The exhaust structure of the vehicle according to claim 5, wherein
a heat shield wall is provided between the exhaust silencer and the mounted component, and
lower ends of the exhaust silencer and the tail pipe are disposed above a lower end of the heat shield wall.

7. An exhaust structure of a vehicle comprising:
an engine disposed in an engine bay formed in a front part of the vehicle;
an exhaust silencer that reduces noise of exhaust gas from the engine and discharges the exhaust gas outside;
an exhaust pipe that couples the engine and the exhaust silencer; and
a mounted component disposed behind the engine and below a floor panel, wherein
the exhaust silencer is disposed between the engine and the mounted component, and
a heat shield wall is provided between the exhaust silencer and the mounted component.

8. The exhaust structure of the vehicle according to claim 7, wherein a width of the heat shield wall in a vehicle width direction is equal to or larger than a width of the mounted component in the vehicle width direction.

9. The exhaust structure of the vehicle according to claim 7, wherein
the exhaust silencer is disposed in a middle position in a vehicle width direction and includes a tail pipe, and
the tail pipe extends to a vicinity of one end in the vehicle width direction, and an outlet of the tail pipe is provided at the vicinity of the one end in the vehicle width direction.

10. The exhaust structure of the vehicle according to claim 9, wherein
lower ends of the exhaust silencer and the tail pipe are disposed above a lower end of the heat shield wall.

11. An exhaust structure of a vehicle comprising:
an engine disposed in an engine bay formed in a front part of the vehicle;
an exhaust silencer that reduces noise of exhaust gas from the engine and discharges the exhaust gas outside;
an exhaust pipe that couples the engine and the exhaust silencer; and
a mounted component disposed behind the engine and below a floor panel, wherein
the exhaust silencer is disposed between the engine and the mounted component,
the exhaust silencer is disposed in a middle position in a vehicle width direction and includes a tail pipe,
the tail pipe extends to a vicinity of one end in the vehicle width direction, and an outlet of the tail pipe is provided at the vicinity of the one end in the vehicle width direction,
a heat shield wall is provided between the exhaust silencer and the mounted component, and
lower ends of the exhaust silencer and the tail pipe are disposed above a lower end of the heat shield wall.

* * * * *